July 27, 1948.  D. V. STELLIN  2,445,978
SOCKET HEAD SCREW
Filed May 7, 1945
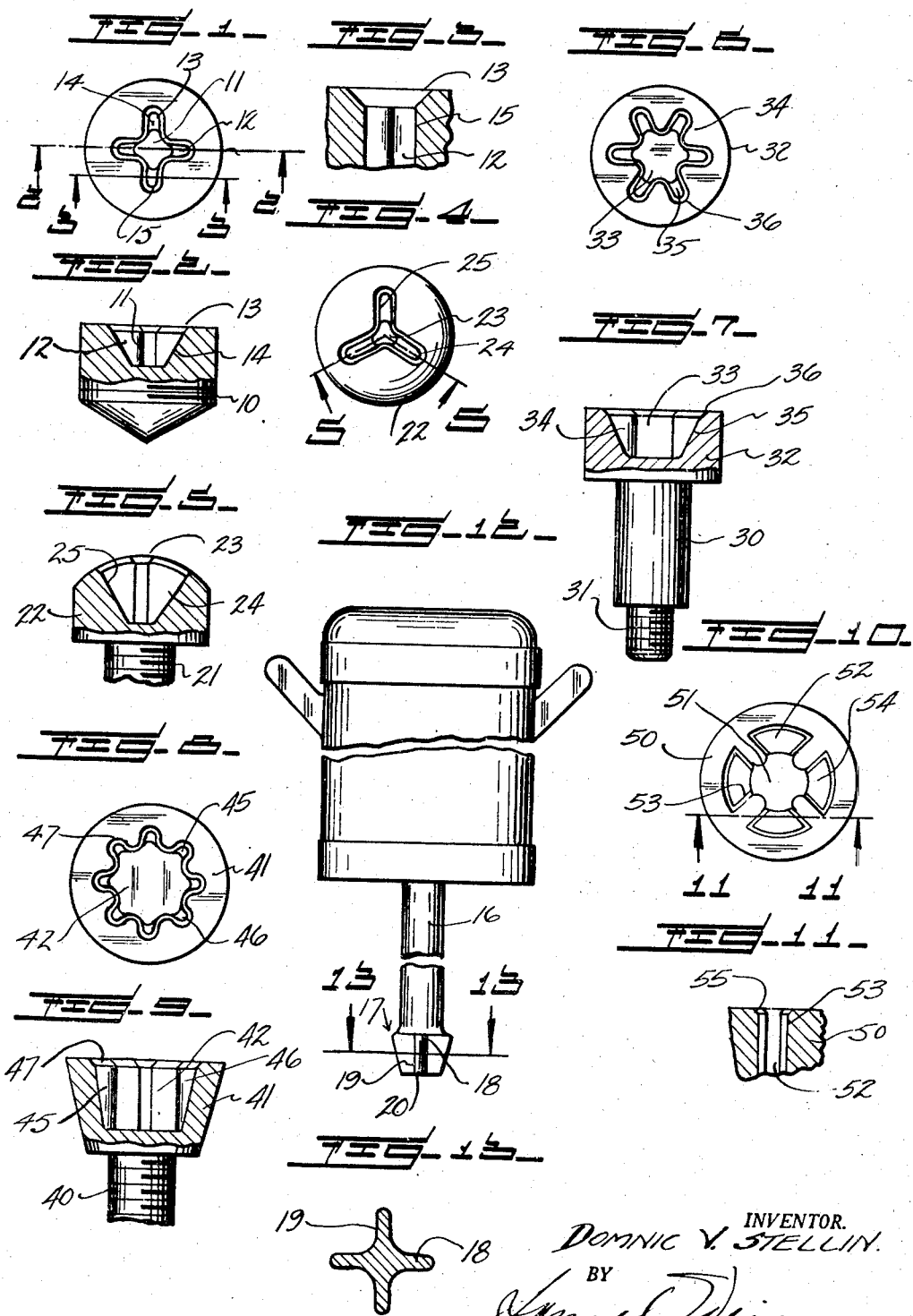
INVENTOR.
DOMINIC V. STELLIN.
BY
ATTORNEY.

Patented July 27, 1948

2,445,978

UNITED STATES PATENT OFFICE 2,445,978

SOCKET HEAD SCREW

Domnic V. Stellin, Detroit, Mich.

Application May 7, 1945, Serial No. 592,480

4 Claims. (Cl. 85—45)

This application is a continuation in part of my co-pending application Serial No. 540,621, filed June 16, 1944, Patent No. 2,397,216 of March 26, 1946.

The present invention pertains to screws of the type having a recess or socket in the head to receive a screw driver, known as the internal wrenching type.

In the use of such screws of existing forms, especially in the case of flat head screws, the head has been known to break off under the action of the power driven screw driver. The head flies off with such force as to injure the operator, if it strikes him, as well as nearby workers crowded together on modern assembly lines. In addition the work is scratched or defaced and the screw head is burred, so that considerable time is lost in removing the broken screw.

One of the objects of the invention is to eliminate the breaking of screws and the resulting injury and damage. The hexagon type of socket, for example, is very popular but is seldom used in flat head screws due to the fact that the thickness of metal around the socket becomes thinner and weaker as the head tapers inwardly of the screw axis. According to my invention, the socket also is tapered inwardly, in various forms as well as the hexagonal, so that the metal thickness around the socket remains constant and the liability of breakage is practically eliminated.

Another difficulty with the present socket head screws is that the power screw driver does not readily enter the socket, since there must be accurate registration of non-circular shapes. Another object of the invention is to overcome this difficulty and is accomplished also by the tapering socket in conjunction with a tapering screw driver. Thus, the screw driver enters the socket quite freely and is gradually seated or registered after entering, thereby avoiding the burring of the screw head top and damaging of the work resulting from initial misalinement.

Still another object of the invention is to eliminate breaking of sharp corners on the screw driver and within the socket. For example, a finger-shaped recess presents sharp corners extending into the recess and liable to breakage. According to the invention, breakage is avoided by rounding off such corners. Again, a triangular recess requires sharp corners on the tool, and this situation is met by rounding the angles of the triangle and also rounding the edges of the screw driver. With the same object in view, sockets with large internal angles of the screw driver strengthen the sharp corners and protect them from breakage.

In connection with the tapering socket and tapering screw driver, as set forth above, the driver does not commence to drive the screw until substantially seated in the socket. This is a necessary result of the tapered formation of the driver and the socket. Another object of the invention is to enable a driving contact on initial entry of the driver into the socket, although both parts are tapered for easy entrance of the driver.

This object is accomplished by a special and novel formation of the radially extending recesses comprised in the socket, whether the socket be in the general shape of a cross, start or gear, and shaping the ribs or wings of the driver correspondingly. The novel formation resides in maintaining each radially extending recess at a uniform width along its depth in any transverse plane. The outermost parts of the walls of the recesses taper toward the axis of the screw and thus give the socket a generally tapered configuration. Also, the opposite lateral walls of each recess may taper toward or away from the axis of the screw but not toward the leading end of the screw.

As a result of this formation, the ribs of the screw driver engage opposite walls of the recesses immediately on entering the socket to establish driving contact with the screw head, even though the driving contact does not extend entirely along the radial length of these walls. Such contact, however, is gradually increased as the driver approaches the bottom of the socket and reaches the maximum when the driven is fully seated in the socket.

The invention is fully disclosed by way of example in the following description and in the accompanying drawings in which:

Figure 1 is a plan view of a set screw with a socket according to the invention;

Figure 2 is a longitudinal section thereof;

Figure 3 is a section on the line 3—3 of Figure 1;

Figure 4 is a plan view of a round head machine screw;

Figure 5 is a longitudinal section thereof;

Figure 6 is a plan view of a stripper screw;

Figure 7 is a longitudinal section thereof;

Figure 8 is a plan view of a wood screw;

Figure 9 is a longitudinal section thereof;

Figure 10 is a plan view of a socket head screw with recesses having opposite walls tapering toward the axis of the screw;

Figure 11 is a section on the line 11—11 of Figure 10;

Figure 12 is an elevation of a power screw driver for the head shown in Figure 1, and Figure 13 is a section on the line 13—13 of Figure 12.

Reference to these views will now be made by use of like characters which are employed to designate corresponding parts throughout.

The several shapes of sockets shown herein are applicable to types of screws other than those with which they are specifically identified in the drawings. Various types of screws are shown merely for the purpose of illustrating the applicability of the invention thereto, and it will be understood that any specific shape of socket may be used with any particular style of screw.

In Figures 1 and 2 is shown a set screw 10 having a socket 11 formed in its head. The socket comprises, in addition to its main central portion, a plurality of radially or outwardly extending recesses 12 which are preferably all of like shapes. Around the upper end or margin of the recess is formed a substantial chamfer 13 for a purpose that will presently be described.

The outermost walls 14 of the socket, or those most remote from the axis of the screw, converge downwardly towards the axis, as clearly illustrated in Figure 2. The screw driver is similarly tapered, as will presently be shown, and as a result the small or free end of the driver enters loosely into the socket and gradually becomes fully seated. It is evident that the driver enters easily, since it need not initially fit in the socket.

The characteristic feature of the recesses 12 is shown in Figure 3. Notwithstanding the taper of the walls 14, the opposite walls 15 of a recess 12 do not taper in either direction along the axis of the screw. In other words, opposite walls maintain a uniform distance apart along any given transverse section in a plane parallel to the axis of the screw. These walls may taper radially inward or outward, as will presently be shown, yet their spacing is maintained uniform along the depth in any given transverse plane.

The power driven screw driver 16 shown in Figure 12 has a head 17 shaped similarly to the socket 12—14. The head comprises ribs or wings 18 adapted to fit respectively in the recesses 12. The side walls 19 of each rib are related to each other as are the opposite walls 15 of the recesses 12, that is, in any transverse plane they do not taper from one end to the other.

The small end of the driver obviously enters the large end of the recess easily or without a full fit. At the initial entry, the ribs 18 must extend slightly into the recesses 12. The matching occurs easily because of the slight initial radial extent thereof and the rounded formation of the outer ends of the ribs 18.

Because of the described relations, the walls 19 at the entering end of the driver 16 come immediately into contact with the walls 15 of the recesses 12 near the inner ends thereof. A driving contact is thus established immediately although it does not exist along the entire radial extent of the walls 15, 19. It is sufficient however for the initial feed of the screw. As the driver continues to enter the recess, the area of driving contact increases gradually as the ribs 18 gradually fill the recesses 12. This rate of increase is generally proportional to the rate of turning resistance of the screw as it feeds farther into the work. Finally, the driver head becomes fully seated in the socket as the outer ends 20 of the ribs 18 seat against the sloped walls 14 of the recesses 12.

In Figures 4 and 5 is shown a round head set screw having a threaded shank 21 and a head 22. The socket 23 therein is of three-fingered formation having radial fingers or recesses 24. The walls 25 constituting the outer ends of the recesses taper downwardly toward the axis of the screw as may be seen in Figure 5. The driver for this socket is shaped and tapered to fit finally in the socket. A transverse cross-section of a recess 24 has the appearance of Figure 3, the side walls being equidistant along any transverse plane. This relation is true of all the modifications hereinafter described and will therefore not be specifically mentioned in each case.

Figures 6 and 7 show a stripper screw having a shank 30, a threaded end 31 and a cylindrical head 32. The socket 33 therein is multi-fingered in the form of an internal gear, providing a plurality of closely spaced radially extending recesses 34. The outer end walls 35 of the recess taper downwardly toward the axis of the screw, while the entrance to the recess is formed with a substantial chamfer or lead 36.

Figures 8 and 9 show a similar socket in connection with a wood screw having a threaded shank 40 and a tapered head 41. The socket 42 is also multi-fingered or in the shape of an internal gear as in Figures 6 and 7, but having a still larger number of radially extending recesses 45. The outermost walls 46 of the recess taper downwardly toward the axis of the screw, and the upper end of the socket is formed with a substantial chamfer or lead 47.

Figures 10 and 11 show a socket somewhat similar to that of Figures 1 and 2. The screw head 50 has a socket 51 formed with a number of outwardly or radially extending recesses 52. The side walls 53 of the recesses, however, instead of being parallel as in Figures 1 and 2, taper radially of the screw head. Nevertheless, these walls maintain a constant distance apart along any transverse section, or along the depth, as shown in Figure 11. The end walls 54 of the recesses taper radially of the screw as may be seen in Figure 10. The screw driver head is also tapered, in the manner already described in detail, for easy initial entrance into the socket. The driver head is shaped similarly to the socket and, notwithstanding the radially directed taper of the walls 53 and the corresponding walls of the driver head, an initial driving contact is immediately established in the manner already described and gradually increased to the maximum until the head is fully seated in the socket. A substantial chamfer is formed at the entrance of the socket.

Where the opposite walls of the radial recesses converge toward the center of the socket, they serve the purpose of throwing an uncentered, fast spinning driver off the screw before any damage is done. It will be understood in this connection that, on high production lines, the operators do not always aline the drivers accurately with the sockets in the screws. Where the opposite walls of the radial recesses diverge toward the center of the socket, they will lead a fast spinning driver into the socket almost instantly, even though the driver is carelessly applied or is misalined, and the likelihood of damage to the screw is substantially reduced.

The initial entrance of the driver into the socket is further facilitated in each case by the provision of a generous chamfer or lead. It is evident that various other shapes of sockets and drivers may be provided and yet retain the characteristics of radially extending recesses with opposite walls uniformly spaced along a transverse sectional plane to provide driving contacts, although small, on immediate entrance of the driver into the socket.

Although a specific embodiment of the invention has been illustrated and described, it will be understood that various alterations in the details of construction may be made without departing from the scope of the invention as indicated by the appended claims.

What I claim is:

1. A screw comprising a shank-like body member having a socket extending axially from one of its end surfaces, said socket including a plurality of substantially radially extending recesses, the walls of said recesses extending to said end surface, opposite walls of each recess being equidistant along any plane transverse of the recess and parallel to the axis of said member, the outer wall of each recess sloping downwardly toward said axis, said opposite walls of each recess converging toward each other in a radial direction.

2. A screw comprising a shank-like body member having a socket extending axially from one of its end surfaces, said socket including at least three substantially radially extending recesses, the walls of said recesses extending to said end surface, opposite walls of each recess being equidistant along any plane transverse of the recess and parallel to the axis of said member, the outer wall of each recess sloping downwardly toward said axis, said opposite walls of each recess converging toward each other in a radial direction.

3. A screw comprising a shank-like body member having a socket extending axially from one of its end surfaces, said socket including a plurality of substantially radially extending recesses, the walls of said recesses extending to said end surface, opposite walls of each recess being equidistant along any plane transverse of the recess and parallel to the axis of said member, the outer wall of each recess sloping downwardly toward said axis, said opposite walls of each recess converging toward said axis.

4. A screw comprising a shank-like body member having a socket extending axially from one of its end surfaces, said socket including at least three substantially radially extending recesses, the walls of said recesses extending to said end surface, opposite walls of each recess being equidistant along any plane transverse of the recess and parallel to the axis of said member, the outer wall of each recess sloping downwardly toward said axis, said opposite walls of each recess converging toward said axis.

DOMNIC V. STELLIN.

REFERENCES CITED

The following references are of record in the file of this patent:

UNITED STATES PATENTS

| Number | Name | Date |
| --- | --- | --- |
| 308,246 | Frearson | Nov. 18, 1884 |
| 1,075,710 | Goodwin | Oct. 14, 1913 |
| 1,894,034 | Fieg | Jan. 10, 1933 |
| 2,046,839 | Phillips et al. | July 7, 1936 |
| 2,173,707 | Brown | Sept. 19, 1939 |
| 2,182,568 | Olson | Dec. 5, 1939 |
| 2,216,382 | West et al. | Oct. 1, 1940 |
| 2,285,461 | Purtell | June 9, 1942 |
| 2,312,471 | Low | Mar. 2, 1943 |
| 2,402,342 | Phillips | June 18, 1946 |